(12) United States Patent
Buehler

(10) Patent No.: US 7,529,364 B2
(45) Date of Patent: May 5, 2009

(54) PROTECTIVE COVER FOR ELECTRONIC DEVICE

(75) Inventor: Doyle Buehler, Winnipeg (CA)

(73) Assignee: Imbibo, Inc., Manitoba (CA)

( * ) Notice: Subject to any disclaimer, the term of this patent is extended or adjusted under 35 U.S.C. 154(b) by 585 days.

(21) Appl. No.: 10/993,310

(22) Filed: Nov. 19, 2004

(65) Prior Publication Data

US 2005/0116334 A1  Jun. 2, 2005

Related U.S. Application Data

(60) Provisional application No. 60/523,510, filed on Nov. 19, 2003.

(51) Int. Cl.
*H04M 1/00* (2006.01)
*H04M 9/00* (2006.01)

(52) U.S. Cl. ............... 379/451; 379/437; 455/575.8

(58) Field of Classification Search .......... 379/351, 379/437, 452; 455/575.8; 150/154, 161, 150/162, 165; 206/320, 811
See application file for complete search history.

(56) References Cited

U.S. PATENT DOCUMENTS

| 4,901,852 | A | | 2/1990 | King |
| 6,082,535 | A | * | 7/2000 | Mitchell ............... 206/320 |
| 6,201,867 | B1 | | 3/2001 | Koike |
| 6,975,888 | B2 | * | 12/2005 | Buesseler et al. ...... 455/575.1 |

OTHER PUBLICATIONS

Translated Abstract of KR2002029579 from STN WPINDEX Search.
HP Printable Tattoos, http://wwww.hp.com/music, Hewlett-Packard Development Company, L.P., copyright 2004, 2 pages.
Louis V Style Brown PhoneSkins, Audiovox PM-8920, hppt://cgi.ebay.com/ws/eBayISAPI.dll?ViewItem&category=20340&item=5717481303&rd=1#ebayphotohosting, 2 pages.

* cited by examiner

*Primary Examiner*—Curtis Kuntz
*Assistant Examiner*—Tuan D Nguyen
(74) *Attorney, Agent, or Firm*—Brinks Hofer Gilson & Lione

(57) ABSTRACT

A protective cover for an electronic device including a) a surface layer including vinyl, plastic, silicone, acrylic, rubber or a combination thereof and b) an adhesive layer for affixing the protective cover to the electronic device. The protective cover may further include a release liner to prevent the adhesive layer from engaging surfaces when the protective cover is not in use, for example, when the protective cover is not affixed to an electronic device.

7 Claims, 4 Drawing Sheets

PROTECTIVE COVER FOR ELECTRONIC DEVICE

This application claims the benefit of the filing date under 35 U.S.C. § 119(e) of U.S. provisional application No. 60/523,510, filed on Nov. 19, 2003, which is hereby incorporated by reference in its entirety.

The present invention relates to a protective cover for an electronic device.

BACKGROUND OF THE INVENTION

A variety of covers for electronic devices are known in the art. For example, U.S. Pat. No. 6,082,535 discloses a protective covering for a communications device. The protective covering comprises a resilient one-piece water-impermeable bag. The communications device is inserted through one opening of the bag. While the covering does provide some protection against the elements, and in particular water, it is unlikely that such a covering would be sufficiently form-fitting to be pleasing to the eye. Further, the presence of the protective covering over areas such as the mouthpiece and earpiece of the communications device may obstruct the function of the device.

U.S. Pat. No. 6,201,867 discloses a portable telephone covering formed of a transparent acrylic resin. The covering includes an upper body cover and a lower body cover that are kept in place by snap members. There is no suggestion of the cover having an adhesive layer to affix the cover to the portable phone.

U.S. Pat. No. 4,901,852 discloses a protective cover for pagers, portable radios and the like that comprises a transparent stretchable plastic to cover the top, four sides and at least a portion of the bottom of the device. Unfortunately, the cover does not include an adhesive layer to affix the cover to the device, to prevent movement of the cover relative to the device. Rather, the cover is constructed of a film of transparent, stretchable plastic that is formed somewhat smaller than the electronic device so as to surround and adhere to the surface of the device.

Canadian Patent application 2,149,566 discloses a cell-guard which comprises a sewn pouch made from leather, vinyl or composite that contains a piece of lead graphite or other suitable protective material to reduce the emission of radiation from cell phones. Unfortunately, the pouch adds substantial bulk to the cellular phone and the phone must be removed from the pouch to be used.

Korean patent application KR2002029579 discloses an advertising method using a cellular phone to maximize the efficiency of advertisement by introducing more frequent contact with more various customers. The application also discloses a sealing method for attaching an advertisement sticker to the whole surface of a cellular phone or part of a cellular phone.

There is a need in the art to provide protective covers for electronic devices which comprise one or more characteristics of the following:

The surface layer is made from vinyl, plastic, rubber, silicone, acrylic or a combination thereof; the protective cover is affixed to the electronic device using an adhesive, preferably a pressure sensitive adhesive; the protective cover is contoured, flexible, substantially non-stretchable, of a specific thickness to provide durability but not increase substantially the bulk of the electronic device. Further there is a need in the art for customized protective covers.

It is an object of the invention to overcome disadvantages of the prior art.

The above object is met by the combinations of features of the main claims, the sub-claims disclose further advantageous embodiments of the invention.

SUMMARY OF THE INVENTION

The present invention relates to a protective cover for electronic devices.

According to the present invention there is provided a protective cover for an electronic device comprising a) a surface layer comprising vinyl, plastic, silicone, rubber, acrylic or a combination thereof and b) an adhesive layer for affixing said protective cover to the electronic device. The protective cover may further comprise a release liner to prevent the adhesive layer from engaging surfaces when the protective cover is not in use, for example, but not limited to when the protective cover is not affixed to the electronic device.

The present invention also provides a protective cover as defined above, wherein the electronic device is selected from the group consisting of cellular phones, personal display assistants, pagers, radios, two-way radios, CBs, palm pilots, computers, laptop computers, cash registers, music, video and audio devices, including but not limited to portable music, video and audio devices, electronic organizers, remote controls for electronic devices, parking meters, electronic gaming systems and the like.

The present invention also provides a protective cover as defined above, wherein the protective cover comprise a pressure sensitive adhesive for example, but not limited to a vinyl pressure sensitive adhesive, a silicone pressure sensitive adhesive, an acrylic pressure sensitive adhesive or a rubber pressure sensitive adhesive or a combination thereof. The pressure sensitive adhesive may be removable or substantially non-removable.

The present invention also provides a protective cover as defined above, wherein the cover is contoured to the shape of one or more faces, lines or ridges of the electronic device. Further, the protective cover may comprise one or more apertures, tear away sections, peel away sections, punch out sections, or a combination thereof.

The present invention also provides a protective cover as defined above, wherein the cover is characterized as being flexible, substantially non-stretchable, and tear resistant.

The present invention also provides a protective cover as defined above, wherein the protective cover comprises a thickness of less than about 1 mm, preferably a thickness in the range of about 0.05 mm to about 0.5 mm.

The present invention also provides a protective cover as defined above, wherein the cover comprises one or more liquid laminates, solid laminates, or a combination thereof applied to the layer comprising vinyl, plastic, silicone, rubber, acrylic or a combination thereof.

The present invention also provides a protective cover as defined above wherein the cover is customized to comprise one or more colors, text, names, company brands, slogans, images, patterns, designs, graphics, photographs, logos, advertisements or a combination thereof.

This summary of the invention does not necessarily describe all necessary features of the invention but that the invention may also reside in a sub-combination of the described features.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1A:
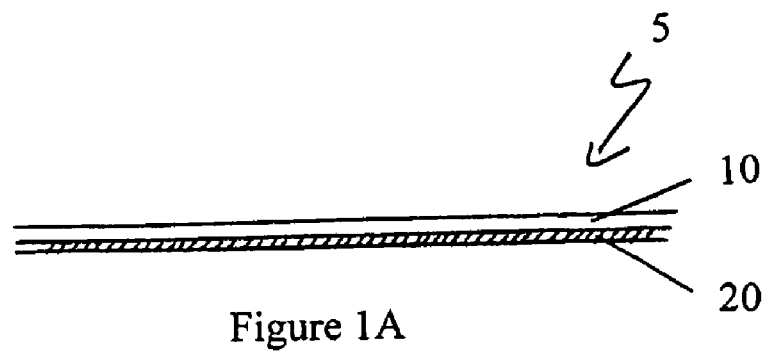
FIGS. 1A-C show three representative cross-sectional views through a protective cover.

The present invention relates to a protective cover for an electronic device.

The following description is of a preferred embodiment by way of example only and without limitation to the combination of features necessary for carrying the invention into effect.

According to the present invention there is provided a protective cover for an electronic device comprising, a) a surface layer comprising vinyl, plastic, rubber, silicone, acrylic or a combination thereof, and;

b) an adhesive layer or coating for affixing the protective cover to the electronic device.

The protective cover for the electronic device may further comprise a release liner or backing strip that protects the adhesive layer from engaging surfaces when the protective cover is not in use, for example, but not limited to, when the protective cover is not affixed to an electronic device.

By the term "electronic device" it is meant any electronic device known in the art, for example, but not limited to electronic communication devices such as cellular phones, personal display assistants (PDAs), pagers, radios, two-way radios, CBs, palm-pilots, cameras, MP3 players, music, video and audio devices, including but not limited to portable music, video and audio devices, electronic organizers, remote controls for electronic devices, and the like. Other electronic devices, for example, but not limited to electronic gaming systems, computers, laptops, cash registers, monitor frames, parking meters are also meant to be included within the scope of the meaning of the term "electronic device". In a preferred embodiment, which is not meant to be limiting in any manner, the electronic device may be a cellular phone. Any cellular phone known in the art may be considered an electronic device as described herein.

The adhesive layer or coating permits the protective cover to be affixed to an electronic device. Preferred adhesives that may be employed in the adhesive layer include pressure sensitive adhesives. The protective cover may comprise pressure sensitive adhesives comprising vinyl, silicone, acrylic, rubber or a combination thereof. However, other adhesives may also be employed to affix the protective cover to the electronic device.

In a preferred embodiment the protective cover comprises a vinyl or acrylic pressure sensitive adhesive. For most applications, vinyl or acrylic adhesives provide a suitable range of performance characteristics enabling the protective cover to remain adhered through a wide variety of environmental conditions. However, rubber and/or silicone adhesives may also be employed in the adhesive layer or coating. For example, but not to be considered limiting in any manner, in instances wherein an electronic device may be exposed to high temperatures, or where the electronic device may generate substantial heat, it may be preferable to employ a silicone-based adhesive. Alternatively, it may be preferable to employ a rubber-based adhesive in instances where a strong, essentially permanent bond between the protective cover and electronic device is desired at temperatures in the range of about 15° C. to about 30° C. However, the use of such adhesives, alone or in combination is not meant to be limited to the particular conditions endured or created by the electronic device.

As will be evident to a person of skill in the art, a pressure sensitive adhesive such as, but not limited to a vinyl pressure sensitive adhesive may comprise a protective cover as described herein provided it comprises a surface layer (ie. Vinyl) and an adhesive layer or coating. Alternatively, a layer of vinyl without adhesive attached may be employed, after which the adhesive layer could be placed separately thereon. The adhesive may be applied to the vinyl or other suitable surface in any manner known in the art, for example, but not limited to, via a spray or other application.

Suitable adhesives may be obtained from a variety of suppliers known in the art, for example, but not limited to Avery Dennison.

In an embodiment of the invention, the adhesive layer or coating may be chosen such that the protective cover is removable from the electronic device or repositionable after being affixed thereto. For example, but not wishing to be limiting in any manner, the protective cover may be peeled off the electronic device when desired. In such an embodiment, a vinyl or acrylic pressure sensitive adhesive is preferred, more preferably a light tack adhesive. Alternatively, the adhesive layer or coating may be permanent or essentially permanent, such that the protective cover is non-removable or essentially non-removable from the electronic device after being affixed thereto. In such an embodiment the protective covers, may be affixed over top of one or more previously affixed protective covers.

The protective cover of the present invention is preferably flexible permitting it to be wrapped around one or more sides of the electronic device. Further, the protective cover may be wrapped around other parts of the electronic device, for example, buttons, antennas and the like, if desired, and thus it is preferred that the protective cover also be tear resistant. Also, it is preferable that the protective cover does not obstruct the functionality of the electronic device.

In an embodiment of the present invention, which is not meant to be limiting, the protective cover is substantially non-stretchable. By the term "substantially non-stretchable" it is meant capable of being deformed, for example stretched along an axis by less than about 200% of its normal size, more preferably less than about 100%, still more preferably less than about 50%, and still more preferably less than about 30%, without resulting in destruction, for example, but not limited to tearing of the protective cover.

The protective cover may be contoured to conform to the shape of an electronic device. Further, the protective cover may comprise one or more apertures, tear away sections, peel away sections, punch out sections, for example, but not limited to die punched sections permitting parts of the electronic device such as, but not limited to controls, dials, buttons, antennas, input jacks/output jacks, displays, microphones, speakers, signal ports (i.e. infrared signal ports), hardware connector ports, software connector ports, battery compartments and the like of the electronic device to be surrounded, but not covered by the protective cover. However, in a separate embodiment, which is not meant to be limiting, it is also contemplated that the protective cover may be affixed over or around one or more controls, keypads, dials, buttons, antennas, input jacks/output jacks, display screens, microphones, speakers or the like, preferably without substantially affecting the function of the control, dial, sound transmission, etc. Combinations of the embodiments are also possible.

The apertures, tear-away sections, peel away sections, punch out sections and the like may be created by any suitable process known in the art, for example, but not limited to a die cutting process, a contour cutter or any other cutting device that is capable of cutting a set pattern or outline for the electronic device.

The present invention also contemplates a protective cover comprising, a) a layer comprising vinyl, plastic, silicone, rubber, acrylic or a combination thereof;

b) an adhesive layer or coating for affixing the protective cover to the electronic device; and c) one or more a liquid laminates, solid laminates, or a combination thereof applied to the layer comprising vinyl, plastic, silicone, rubber, acrylic or a combination thereof.

In an alternate embodiment, the protective cover may comprise a layer comprising paper, an adhesive layer or coating for affixing the protective cover to the electronic device and optionally, one or more liquid laminates, solid laminates, or a combination thereof applied to the paper layer.

Preferably one or more laminates are employed after an image or the like has been printed on the vinyl or plastic layer. The addition of the laminate seals the print and enhances durability of the protective cover. It is also contemplated that the protective cover may comprise multiple laminates, either of the same or different kinds to further increase the durability of the protective cover.

The protective cover of the present invention may comprise dimensions such that it capable of covering a single side or face of the electronic device, or a portion of a single side or face of an electronic device, for example, such as the face of a cell phone. Alternatively, the protective cover may comprise dimensions such that it may be wrapped around one or more sides of the electronic device, or portions of one or more sides of the electronic device.

In an embodiment of the present invention, which is not meant to be limiting in any manner, the protective cover is preferably a thin protective cover comprising a maximum thickness of less than about 1 mm, more preferably less than about 0.5 mm. In an alternate embodiment, the protective cover comprises a thickness in the range of about 0.05 mm to about 0.6 mm, preferably about 0.07 mm to about 0.5 mm. In still an alternate embodiment, the protective cover comprises a vinyl surface layer with a thickness of about 0.003 inches (about 0.0762 mm). It is also contemplated that the protective cover of the present invention may comprise a plurality of different thicknesses over the surface of the cover. For example, but not wishing to be limiting, a particular section of the protective cover may comprise a plurality of laminates and thus be thicker than an adjacent section of the protective cover. The thicker sections may provide increased durability and protection to the underlying electronic device when affixed thereto.

It is also contemplated that the protective cover may comprise a material that is transparent or substantially transparent, or comprise one or more parts which are transparent or substantially transparent. In an embodiment which is not meant to be limiting in any manner, the transparent or substantially transparent portion may optionally cover a display screen or the like. As will be evident to a person of skill in the art, in such an embodiment it is preferred that the transparent portion that covers a display screen employ an adhesive that does substantially affect the visual transfer of information from the device to the user. It is also contemplated that a transparent portion of the protective cover may lack an adhesive layer. However, in such an embodiment, it is generally preferred that the region of the protective cover that surrounds the display screen be affixed to the electronic device.

The protective cover may be customized or personalized by including thereon one or more colors, text, names, company brands, slogans, images, patterns, designs, graphics, photographs, logos, advertisements, or any combination thereof. These images, designs, graphics colors or the like may be provided by a customer or person who wishes to customize an electronic device. In an embodiment of the present invention, which is not meant to be limiting in any manner, a thermal printing process using resin based film, ribbon or foils may be employed. In such an embodiment, the printing head is heated, resin ribbons, or foils are moved under head, locally melting and adhering to the vinyl substrate. Such a system may employ process colors (Cyan, Magenta, Yellow, Black), and/or spot colors (individual colors). Further, any product that has the ability to transfer its material properties or colors to the substrate, such as glossy coatings, reflective and transparent coatings, abrasion guards and the like, may be employed in a suitable process, for example, offset printing or the like. Protective covers may also be customized using a solvent based vinyl printing process utilizing liquid inks, with similar characteristics to process/spot colors as known in the art. A suitable printer may print graphics and subsequently, the necessary portions may be cut out by a punch, die-cutting machine, contour cutter, for example, but not limited to a CNC cutter, linear cutting blade, or the like. Alternatively, a thermal/solvent printer may be employed followed by a specialized machine to cut the protective covers to an appropriate size. Other methods may also be employed as would be evident to someone of skill in the art, and such methods are meant to be encompassed within the scope of the present invention.

Any method of transferring images and the like to the protective cover, for example, but not limited to, screen printing may be employed to transfer images to the protective cover. Further, it is also contemplated that preprinted vinyls and other materials as described herein that contain colors, images, photographs, images or the like may be employed in the protective cover. Further still, the material may also comprise photoreflective, holographic, color shifting, metallic (sparkling), photoiridescent materials or a combination of these materials.

The protective covers as described herein may provide protection of electronic components from water and moisture as well as bumps, scratches and the like. Further, the protective covers do not interfere or interfere minimally full functionality of electronic device. Also, the protective covers may be customized/personalized to the tastes of the owner. In this and similar manners, the protective covering may be useful for protecting electronic devices such as cell phones and aiding in company phone identification, phone re-branding, enterprise advertising and promotion, and special events marketing.

Templates of an electronic device, for example, but not limited to a cellular phone may be made from photographs and/or scans of phones. Alternatively, dimensions and characteristics of the phones may be obtained from a manufacturer, supplier or other organization. Commercial software, for example, but not limited to vector tracing programs may be employed to aid in this process of tracing contour lines for the protective cover. Generally, the templates create a trace line that may be used by the computer, printer, cutter or a combination thereof, as a contour line to maintain a clean cut, and to print "between the lines". Templates may also be employed to make the necessary customized graphical designs. Whenever a template can be made for a phone or other electronic device, a protective cover can be made as well.

The present invention also contemplates a method of producing a customized protective cover for an electronic device comprising, a) receiving an image or the like from a person wishing to customize the electronic device with a protective cover;

b) if necessary, converting the image or the like into electronic format;

c) obtaining the dimensions of the electronic device;

d) formatting the image for transfer to the protective cover of the electronic device;

e) transferring the image onto a surface layer of the protective cover.

The image or the like to be transferred to the protective cover may be provided in electronic format as is known in the art. Alternatively, the image or the like may be provided in "hard-copy" and subsequently transferred into an electronic format, for example, but not limited to by scanning or the like. In this manner the image or the like may be manipulated, for example, but not limited to resized, stretched, shrunk or the like. Further, the image may be manipulated by changing one or more colors contained therein, objects in the image may be removed, replaced or electronically "painted over", multiple images may be combined or overlaid, text may be added, and the like. In this manner, the protective cover may be customized as to the needs and/or desire of the user of the electronic device. However, it is also possible that a person may select a protective cover that already comprises an existing image, design, picture or the like.

The dimensions of the electronic device may be obtained in one or several ways. For example, it may be possible to scan an electronic device into a suitable program to produce a template of that electronic device. As is known to a person of skill in the art, the electronic device may be scanned multiple times in different positions to ensure the front, back, sides, top and bottom of the electronic device are obtained. The scanned images may be processed by an operator or other person to ensure that suitable information is obtained to permit a template to be created for the electronic device. It is also contemplated that a manufacturer or the like may provide dimensions of an electronic device. In such a case, it may not be necessary to scan an electronic device to make the template for it.

The method may also comprise one or more additional steps. For example, but not wishing to be limiting, the method may further comprise a step of cutting the protective cover after the image or the like has been transferred thereto. Also, as described previously, one or more laminates may be applied to the protective cover after the image has been transferred thereto.

The above description is not intended to limit the claimed invention in any manner, furthermore, the discussed combination of features might not be absolutely necessary for the inventive solution.

The present invention will be further illustrated in the following examples. However it is to be understood that these examples are for illustrative purposes only, and should not be used to limit the scope of the present invention in any manner.

Figure 1B:
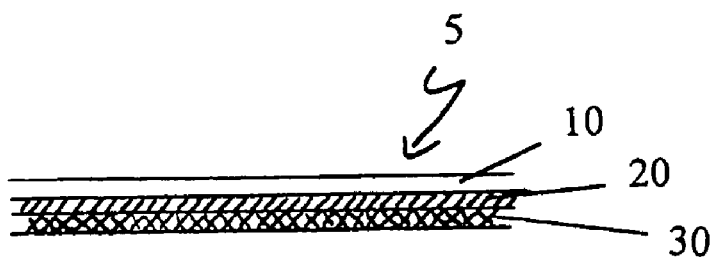
Figure 1C:
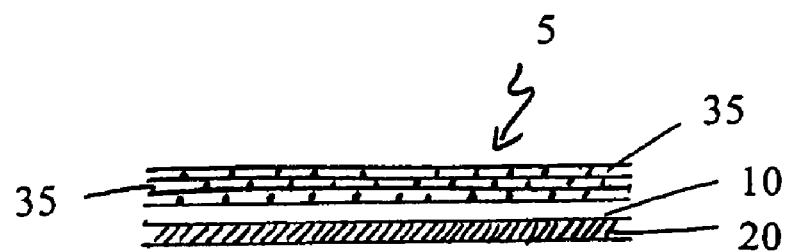
Figures 2A, 2B:
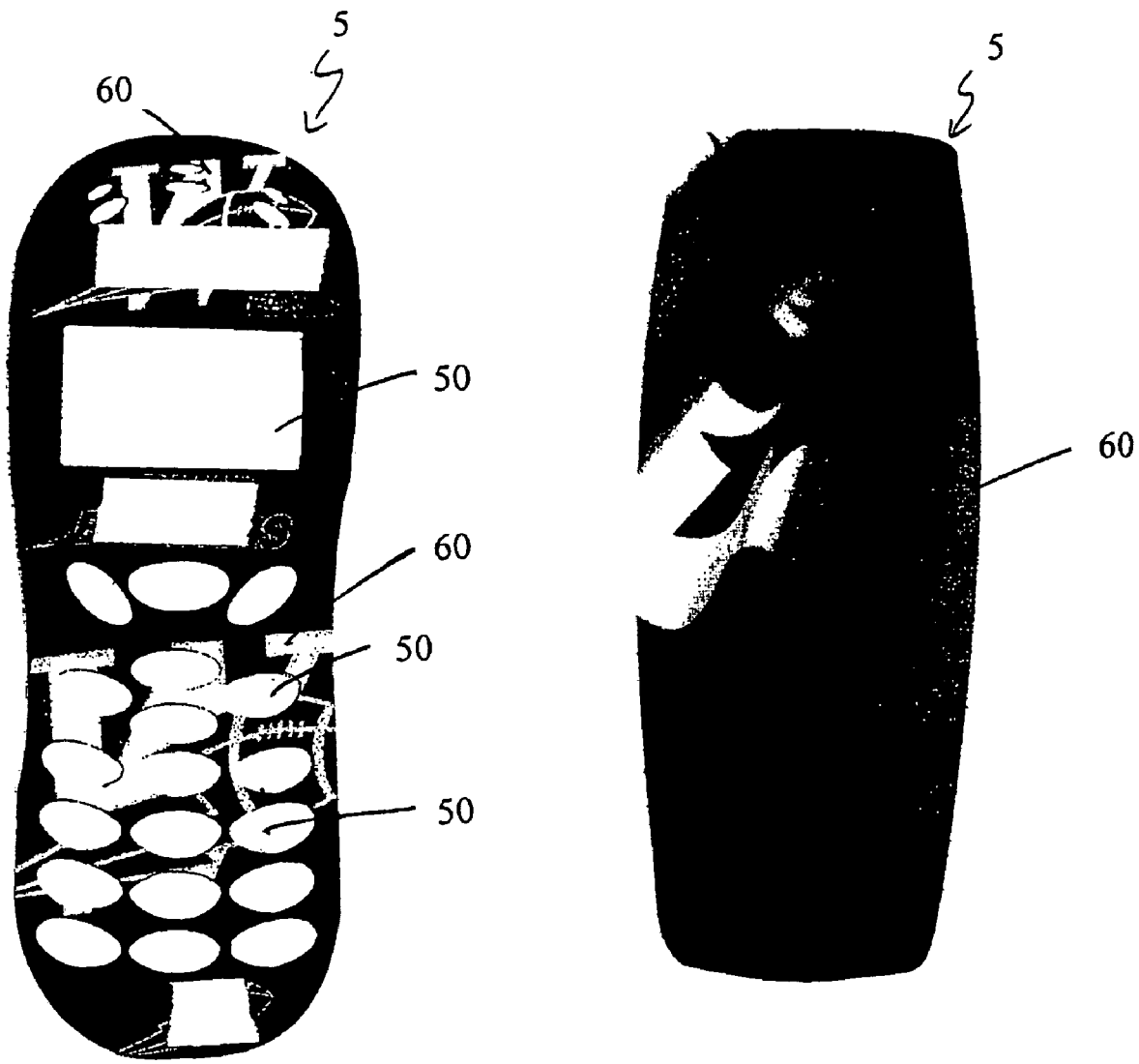
FIGS. 2A-C show three representative plan views of the protective cover.
Figure 2C:
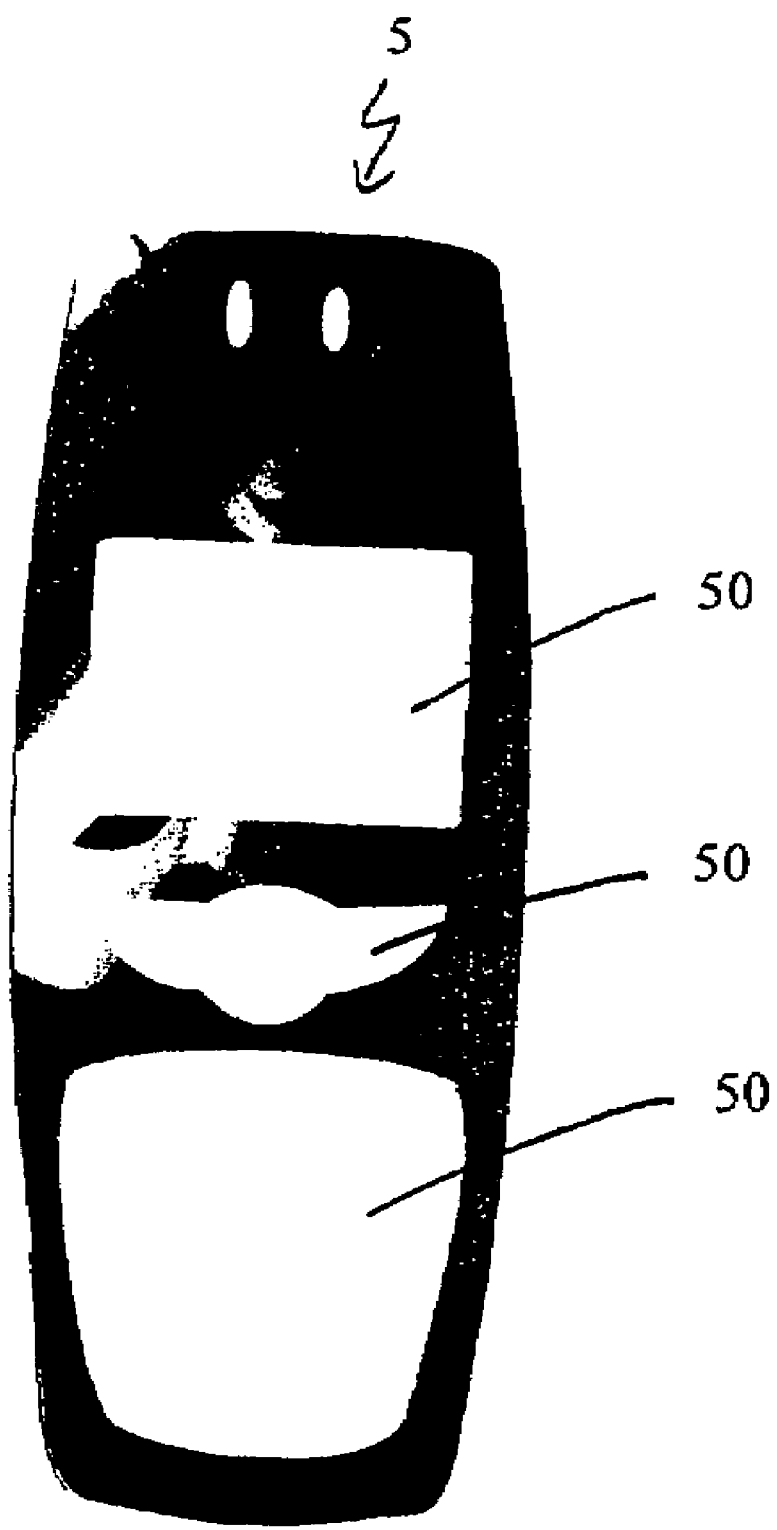
Figure 3:
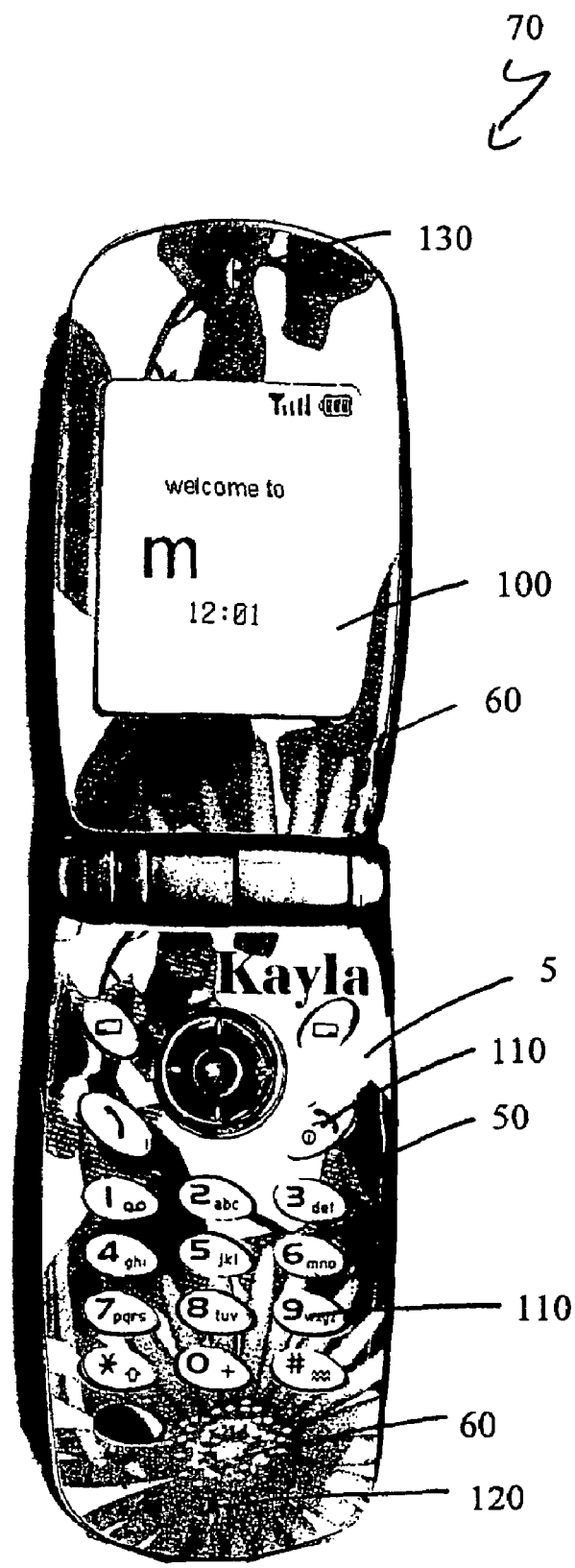
FIG. 3 shows a representative view of the protective cover affixed to a surface of an electronic device.

Referring now to FIGS. 1-3, there are shown representative embodiments of the present invention. Shown in FIGS. 1A, 1B and 1C are cross-sectional views of the protective cover (5) of the present invention having surface layer (10) comprising vinyl, plastic, paper, silicone, acrylic, rubber or other suitable material and adhesive layer (20). As shown in FIG. 1B is release liner (30) which prevents the adhesive layer from engaging surfaces when the protective cover is not in use, for example, but not limited to when the protective cover is not affixed to the electronic device. Shown in FIG. 1C is protective cover (5) comprising a plurality of laminates (35), for example, liquid laminates, solid laminates or a combination thereof which may be applied to the surface layer of the protective cover.

Shown in FIGS. 2A-C are representative examples of a protective cover (5) that may be affixed to an electronic device (not shown). The protective cover (5) comprises apertures (50) that may surround one or more buttons, displays, etc and do not interfere with the functionality of the protective cover. Protective cover may also comprise a design (60) or the like on the protective cover. The protective cover in FIG. 2B as shown comprises peel away or tear away sections which may be removed to produce the protective cover shown in FIG. 2C.

Referring now to FIG. 3, there is shown protective cover (5) affixed to an electronic device (70), more particularly a cellular phone. The protective cover comprises apertures (50) which surround portions of the cellular phone including the screen/display (100), buttons (110), microphone (120) and speaker (130). As shown in FIG. 3, the protective cover comprises graphics (60), which customizes or personalizes the electronic device.

As will be evident based on the information disclosed herein, any surface including contoured surfaces may be covered with a protective cover as disclosed herein.

All citations are herein incorporated by reference.

The present invention has been described with regard to preferred embodiments. However, it will be obvious to persons skilled in the art that a number of variations and modifications can be made without departing from the scope of the invention as described herein.

The invention claimed is:

1. A protective cover for a portable communication device or an electronic device comprising: a) a surface layer comprising vinyl, plastic, silicone, rubber or acrylic; b) an adhesive layer for affixing said protective cover to the portable communication device or the electronic device; c) a plurality of apertures, tear away sections, punch out sections, or peel away sections; d) a release liner disposed on the adhesive layer, said liner preventing the adhesive layer from engaging surfaces when the protective cover is not in use and e) one or more liquid laminates or solid laminates, applied to the surface layer of the cover, wherein the adhesive layer comprises a pressure sensitive adhesive, and wherein the cover is characterized as being flexible, substantially non-stretchable, and tear resistant, comprises a thickness of less than about 1 mm and is customized to comprise one or more colors, text, names, company brands, slogans, images, patterns, designs, graphics, photographs, logos or advertisements.

2. The protective cover of claim 1 wherein said portable communication device or said electronic device is selected from the group consisting of cellular phones, personal display assistants, pagers, radios, two-way radios, CBs, palm pilots, computers, laptop computers, MP3 players, music devices, video devices, audio devices, portable music devices, portable video devices, portable audio devices, electronic organizers, remote controls for electronic devices, parking meters, cash registers, display terminals and electronic gaming systems.

3. The protective cover of claim 1, wherein said pressure sensitive adhesive comprises a vinyl pressure sensitive adhesive, a silicone pressure sensitive adhesive, an acrylic pressure sensitive adhesive or a rubber pressure sensitive adhesive or a combination thereof.

4. The protective cover of claim 1, wherein said pressure sensitive adhesive is removable.

5. The protective cover of claim 1, wherein the pressure sensitive adhesive is essentially non-removable.

6. The protective cover of claim 1, said cover being contoured to the shape of one or more faces of an electronic device.

7. The protective cover of claim 1, said cover comprising a thickness in the range of about 0.05 mm to about 0.5 mm.

* * * * *